United States Patent Office 3,475,003
Patented Oct. 28, 1969

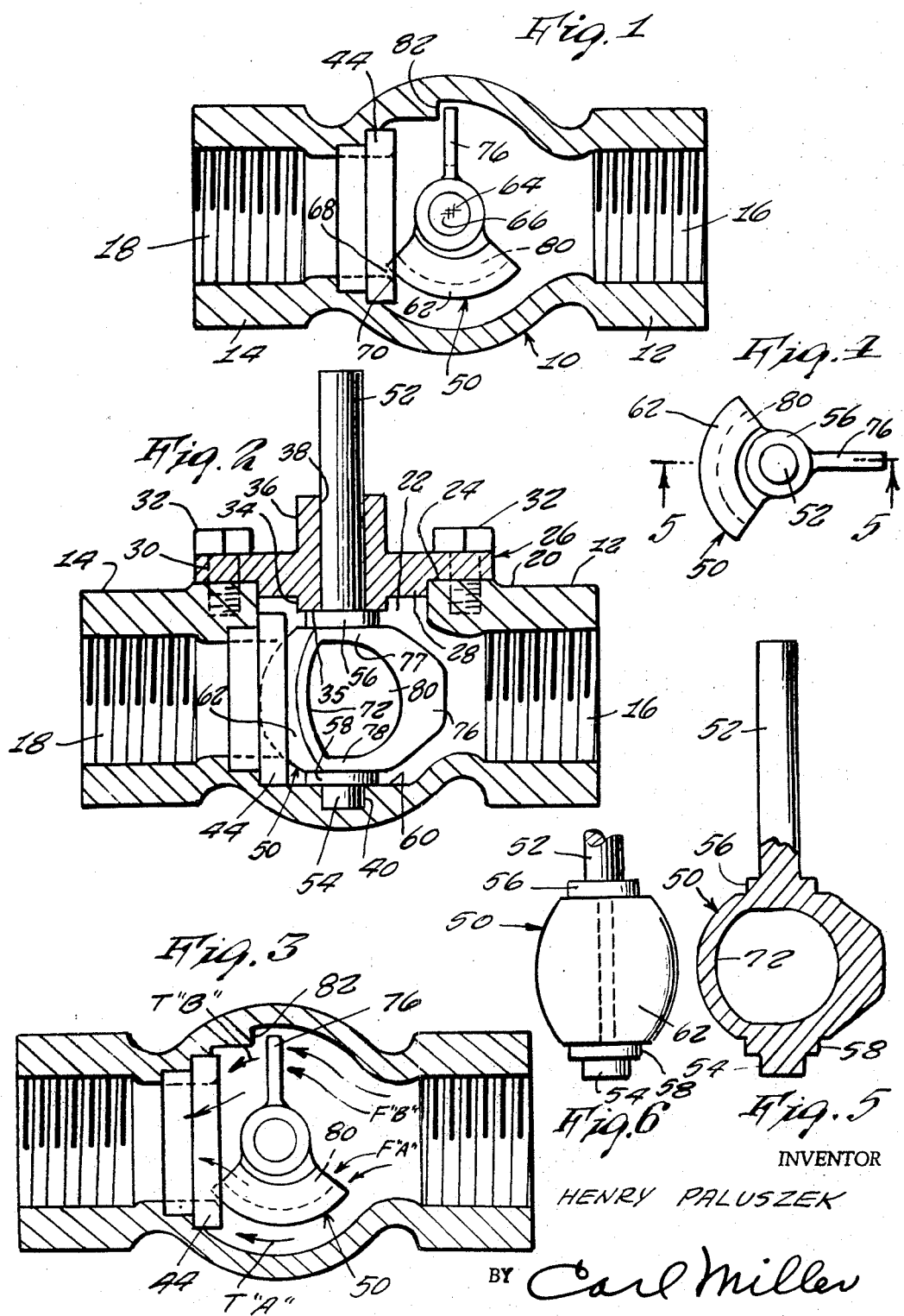

3,475,003
ECCENTRIC BALL VALVE WITH
ANTISLAMMING MEANS
Henry Paluszek, 215 N. Henry St.,
Brooklyn, N.Y. 11222
Filed Nov. 20, 1967, Ser. No. 684,461
Int. Cl. F16k 25/02, 5/06, 39/06
U.S. Cl. 251—163           8 Claims

ABSTRACT OF THE DISCLOSURE

A valve construction of an eccentrically mounted ball valve provided with vane means to hold the valve in open position under equal pressure conditions and prevent slamming of the ball valve when in the open position under unequal pressure conditions.

---

This invention relates to a rotary ball valve for the control of liquid or gaseous flow.

It is an object of this invention to provide a part spherical ball valve carried on a valve stem and eccentric with relation to the axis of the valve stem rotatably supported within a casing to seat on a resilient annular valve seat when closed and to provide a clearance passage between the ball valve and its seat when opened.

Another object of this invention is to provide a flow passage through the ball valve to lie coextensive with the flow of the fluid or gases from the inlet port to the outlet port of the valve casing.

A further object of this invention is to provide a radial vane on the valve stem opposite to the ball valve to effect a balancing of the flow pressure acting on the ball valve so as to prevent slamming thereof when in open position.

It is still another object of this invention to provide a stop within the case to be engaged by the anti-slamming vane when unequal flow pressure reacts thereagainst to prevent movement of the ball valve in a direction away from its seat.

A still further object of this invention is to provide for replacement of the valve seat when damaged or worn.

Other and further objects of the present invention are those inherent in the apparatus as illustrated in the drawings, described in the following specification and as claimed in the appended claims.

FIGURE 1 is a top cross-sectional view of the casing and ball valve.

FIGURE 2 is a side cross-sectional view of the casing and ball valve.

FIGURE 3 is a top cross-sectional view similar to FIGURE 1 showing flow of fluid or gas therethrough.

FIGURE 4 is a top plan view of the ball valve, stem and anti-slamming vane.

FIGURE 5 is a side view partly in section taken on line 5—5 of FIGURE 4.

FIGURE 6 is a side view of the ball valve and stem.

Referring in detail to the drawings, the valve casing a body 10 is substantially spherical and is formed to provide diametrically opposed collars 12 and 14. Collar 12 is internally threaded for connection to an inlet pipe (not shown) and provides an inlet port 16. Collar 14 is similarly internally threaded for connection to an outlet pipe (not shown) and provides an outlet port 18. At one side 20 of the casing 10 there is provided a circular access opening 22, and the casing 10 is formed with an annular flat seat 24 surrounding said opening. A closure cap 26 is formed with an inner circular section 28 machined to have a snug fit within the access opening 22, see FIGURE 2, and a radial flange 30 to seat on the casing seat 24. A gasket (not shown) may be provided between the flange 30 and casing seat 24. Cap bolts 32 securely connect the closure cap 26 to the casing 10.

Extending inwardly of the circular section 28 is an axial boss 34 of short length terminating in a flat end surface 35. Extending outwardly from flange 30 is an axial boss 36 of a length exceeding boss 34. An axial bore 38 extends through both bosses 34, 36 to receive in rotative bearing engagement therewith a valve stem to be hereinafter described.

Provided in the wall of casing 10 opposite the access opening 22 is a cylindrical bearing recess 40 co-axial with the bore 38 in the closure cap 26. Detachably mounted at the inside end of outlet port 18 in any suitable manner is an annular resilient valve seat 44 which may be inserted through access opening 22 for placement in position and which may be removed and replaced whenever the valve seat becomes damaged or worn.

For co-action with the valve seat 44 is a part spherical ball valve 50 formed integral with an operating stem 52 and a bearing support stem 54. Provided at the base of stems 52, 54 respectively are bearing collars 56, 58. In the assembled position of the parts, operating stem 52 extends through axial bore 38 in cap boss 36 with the bearing collar 56 engaging surface 35 of circular section 34, and bearing stem is seated within bearing recess 40 with bearing collar 58 engaging a flat surface 60 formed in the inner wall of the casing 10 and corresponding to surface 35. It is thus seen that the ball valve 50 is securely held against any lateral or axial movement while being free to rotate under the application of a turning force on operating stem 52 which is provided with a suitable handle or wheel (not shown). The outer part spherical surface or face 62 of ball valve 50 has its center, see FIGURE 1, eccentric as at 64 with relation to the axis 66 of the valve stems 52, 54; the eccentricity being such that with the ball valve 50 in fully open position as shown in FIGURE 1 there is provided a clearance 68 between part spherical surface 62 and valve seat 70 of valve seal 44. Also, due to the eccentricity as the ball valve 50 is moved to closed position there will be a gradual reduction in the clearance 68 with full contact of the part spherical surface 62 on valve seal seat 70. The advantages of this valve design are such that the torque is very low until the valve is almost fully closed resulting in reduced wear on the valve seat. Also due to the fact that the ball valve 50 is actually a part spherical wall, the rear side 72 of the ball valve 50 when in its closed position (with face 62 seated on valve seal seat 70), see FIGURE 2, the pressure of the liquid or gas acting against rear side 72 will make for a tighter seal.

Located rearward from the part spherical wall structure of ball valve 50 and in spaced relation thereto is an anti-slamming vane 76 that lies in a diametral plane bi-secting the part spherical ball valve, see FIGURE 1. The ends 77, 78 of the vane 76 are integrally jointed to the corresponding ends of the ball valve and to bearing collars 56, 58. There is thus provided between ball valve 50 and vane 76 an open passage 80 for the flow of the fluid or gas. Vane 76 serves to equalize the slamming torque produced by the fluid flow. Referring to FIGURE 3, with the ball valve 50 in open position arrows F"A" denote the force "A" hitting the ball valve 50 which in turn creates torque "A" as denoted by arrow T"A." This normally (in the absence of vane 76) would slam the valve shut. By use of the vane 76 the force of fluid flow "B" as shown by arrows F"B" acts against vane 76 which in turn set up a counteracting torque as denoted by arrow T"B" that will balance the slamming torque T"A." The resistance surface area of ball valve 50 and vane 76 is made equal so as to provide equal reaction to pressure flow of the fluid or gas so as to establish the requisite balancing effect. Should this balancing effect become unequal due to a variance in the resistance surface area of the ball valve and vane or due to a pressure differential therebetween there is provided on the inside of the valve casing 10 adjacent the end of vane 76 a shouldered stop 82 spaced slightly from the vane end. Under a pressure differential acting to move the vane 76 towards the valve seat 70, the end of vane 76 will engage stop 82 to prevent such movement. The stop 82 may be exteriorly of the casing as on the boss 36 (not shown) to be engaged, as for example, by a lug (not shown) on the operating stem 52.

Having described my invention, what I claim as new and desire to secure by Letters Patent is:

1. A valve apparatus comprising:
   (a) a casing,
   (b) a pair of collars on said casing providing an inlet port and an outlet port,
   (c) a valve seat element mounted within said casing at the inner end of said outlet port,
   (d) a valve element within said casing,
   (e) an operating stem rotatably supported by said casing and connected to said valve element to move the same from closed to open positions,
   (f) said valve element in its closed position having seated engagement with said valve seat,
   (g) said valve element being eccentric with relation to the rotational axis of said operating stem whereby to provide for a gradual separation and approach of the valve element away from and towards said valve seat element and to provide a clearance between the same when moved to open position,
   (h) vane means rigidly connected to said valve element and operating stem acting to establish a balancing effect therebetween under the action of flow pressure thereon when said valve element is in open position, and
   (i) stop means on said casing to be engaged by a part movable with said combined operating stem, ball valve and valve to limit movement of said vane means towards said valve seat.

2. The valve apparatus of claim 1, including:
   (a) a bearing support stem fixed to said valve element co-axial with said operating stem,
   (b) a bearing recess in said casing wall receiving said bearing support stem for rotative bearing engagement therein,
   (c) said vane means being rigidly connected to said bearing support stem and valve element,
   (d) said connections of said vane means being axially spaced to define with said valve element a passage for the flow of fluid or gas when the valve element is moved to open position and permitting flow pressure to react against said valve element when the latter is in closed position.

3. The valve apparatus of claim 2, wherein:
   (a) said operating stem, valve element, bearing support stem and vane are formed as an integral unit.

4. The valve apparatus of claim 3, wherein:
   (a) said valve element is of part spherical wall formation with its outer face and inner side presenting part spherical surfaces.

5. The valve apparatus of claim 4, wherein:
   (a) said valve seat comprises an annular resilient valve seat element detachably mounted at the inner end of said outlet port, and
   (b) an annular seat formed on the rear exposed end of said annular valve seat element receiving in seated engagement thereon the part spherical face of said valve element when in closed position.

6. The valve apparatus of claim 5, including:
   (a) an access opening in the casing wall opposite said bearing recess,
   (b) a closure cap for said opening,
   (c) fastener means detachably securing said closure cap to said case,
   (d) a projecting boss on said closure cap having an axial bore therethrough,
   (e) said operating stem extending through said axial bore in rotative bearing engagement therein,
   (f) said closure cap boss serving as the support for said operating stem, and
   (g) said operating stem along with said bearing support stem serving to mount said valve element within said casing.

7. The valve apparatus of claim 6, including:
   (a) a bearing collar at the base of said operating stem engaging a portion of the inner surface of said closure cap, and
   (b) a bearing collar at the base of the bearing support stem engaging a portion of the inner casing wall adjacent said bearing recess.

8. The valve apparatus of claim 7, wherein:
   (a) said stop means comprises a shouldered stop on the inside wall of said casing adjacent the free terminal end of said vane whereby to be engaged thereby to limit movement of the vane towards said valve seat when said valve element is in full open position.

References Cited

UNITED STATES PATENTS

| | | | |
|---|---|---|---|
| 1,989,009 | 1/1935 | Heggem | 251—163 |
| 2,574,428 | 11/1951 | Wheatley | 251—163 X |
| 2,803,426 | 8/1957 | De Zurik | 251—309 X |
| 2,847,180 | 8/1958 | Ludeman | 251—188 X |
| 3,254,872 | 7/1966 | Roos | 251—163 |
| 3,301,271 | 1/1967 | Burke | 251—175 X |

CLARENCE R. GORDON, Primary Examiner

U.S. Cl. X.R.

251—175, 188, 283, 287, 309, 312